United States Patent
Iwamatsu et al.

(10) Patent No.: US 9,057,809 B2
(45) Date of Patent: Jun. 16, 2015

(54) LIGHT IRRADIATION DEVICE AND IMAGE FORMING APPARATUS

(71) Applicants: Akihiro Iwamatsu, Kanagawa (JP); Tsuyoshi Fujimoto, Kanagawa (JP); Tokiko Inoue, Tokyo (JP)

(72) Inventors: Akihiro Iwamatsu, Kanagawa (JP); Tsuyoshi Fujimoto, Kanagawa (JP); Tokiko Inoue, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/468,382

(22) Filed: Aug. 26, 2014

(65) Prior Publication Data
US 2015/0062668 A1    Mar. 5, 2015

(30) Foreign Application Priority Data
Aug. 28, 2013   (JP) ................................. 2013-176175

(51) Int. Cl.
*H04N 1/04* (2006.01)
*F21V 8/00* (2006.01)
*H04N 1/028* (2006.01)

(52) U.S. Cl.
CPC ............ *G02B 6/0055* (2013.01); *G02B 6/0058* (2013.01); *H04N 1/02835* (2013.01); *H04N 1/02825* (2013.01); *H04N 1/0284* (2013.01)

(58) Field of Classification Search
CPC ........... F21V 5/005; F21V 5/008; F21V 7/00; F21V 7/0008; F21V 7/0091; F21V 7/043; F21V 9/00; F21V 9/02; H04N 13/0468; H04N 1/02835; H04N 13/0402; H04N 13/0413; H04N 13/0418; H04N 13/0422
USPC .......... 358/475, 509, 484, 474; 382/107, 275; 399/168, 220
See application file for complete search history.

(56) References Cited

U.S. PATENT DOCUMENTS

| 4,987,494 | A | * | 1/1991 | Freeman | 348/311 |
| 4,987,499 | A | * | 1/1991 | Kimura | 358/474 |
| 6,152,570 | A | * | 11/2000 | Yokoyama | 362/613 |
| 6,266,314 | B1 | * | 7/2001 | Fukakusa et al. | 369/112.01 |

(Continued)

FOREIGN PATENT DOCUMENTS

| JP | 2005-102112 | 4/2005 |
| JP | 2010-219600 | 9/2010 |

(Continued)

OTHER PUBLICATIONS

U.S. Appl. No. 14/164,439, filed Jan. 27, 2014.
(Continued)

*Primary Examiner* — Negussie Worku
(74) *Attorney, Agent, or Firm* — Harness, Dickey & Pierce, P.L.C.

(57) ABSTRACT

A light irradiation device includes: a light source to output diffused light; and a light guide member to guide the diffused light to an irradiation point. The light guide member includes an incidence surface which the diffused light enters, a first emission surface to emit the entered diffused light, while further diffusing the entered diffused light with a first diffusion characteristic to emit the diffused light at a first diffusion angle, and a second emission surface to emit the entered diffused light, while further diffusing the entered diffused light with a second diffusion characteristics to emit the diffused light at a second diffusion angle. The second diffusion angle provided by the second diffusion characteristic is smaller than the first diffusion angle provided by the first diffusion characteristic.

9 Claims, 10 Drawing Sheets

(56) References Cited

U.S. PATENT DOCUMENTS

| | | | |
|---|---|---|---|
| 6,556,533 B1* | 4/2003 | Fukakusa et al. | 369/112.19 |
| 8,358,450 B2* | 1/2013 | Kim | 358/474 |
| 2005/0088707 A1 | 4/2005 | Sakurai et al. | |
| 2013/0194674 A1* | 8/2013 | Horiuchi et al. | 359/631 |

FOREIGN PATENT DOCUMENTS

| | | |
|---|---|---|
| JP | 2011-071608 | 4/2011 |
| JP | 2011-071609 | 4/2011 |
| JP | 2011-139201 | 7/2011 |
| JP | 2011-171831 | 9/2011 |

OTHER PUBLICATIONS

U.S. Appl. No. 14/193,216, filed Feb. 28, 2014.

\* cited by examiner

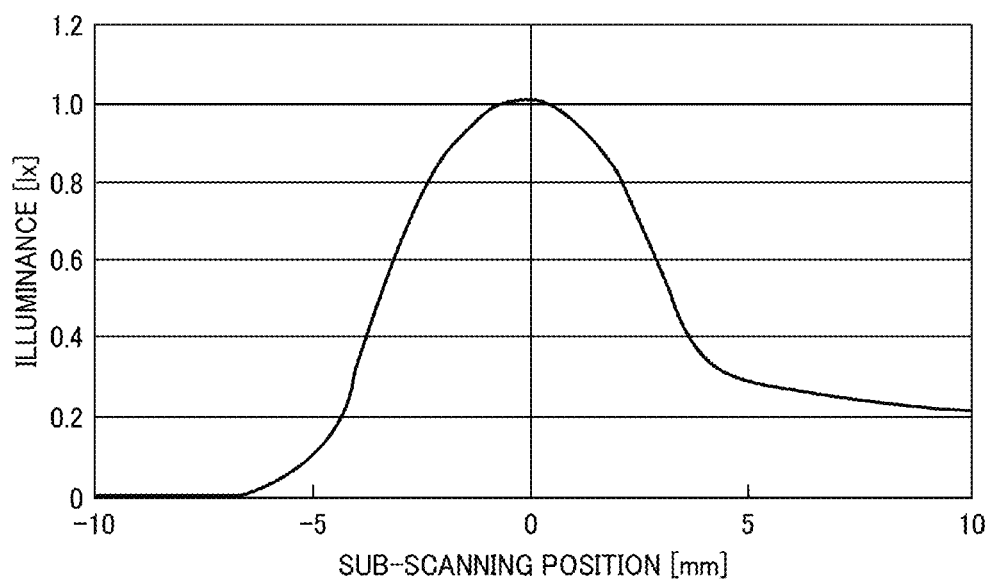

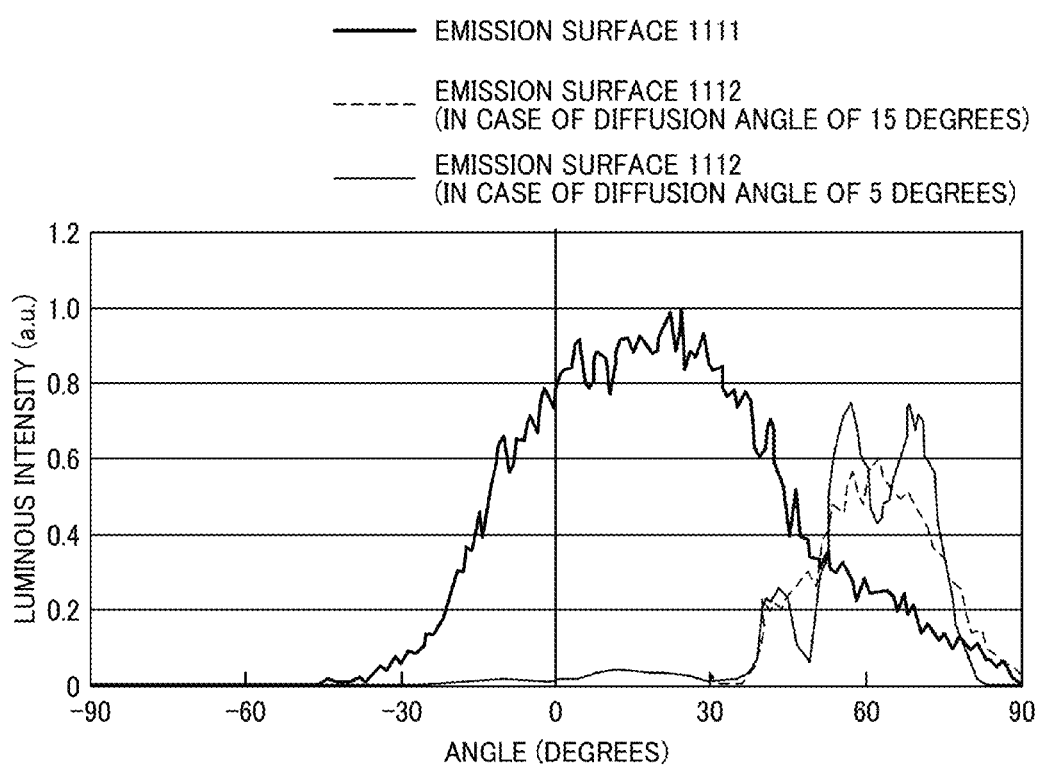

LIGHT IRRADIATION DEVICE AND IMAGE FORMING APPARATUS

CROSS-REFERENCE TO RELATED APPLICATIONS

This patent application is based on and claims priority pursuant to 35 U.S.C. §119(a) to Japanese Patent Application No. 2013-176175, filed on Aug. 28, 2013, in the Japan Patent Office, the entire disclosure of which is hereby incorporated by reference herein.

BACKGROUND

1. Technical Field

The present invention relates to a light irradiation device, and an image forming apparatus including the light irradiation device.

2. Description of the Related Art

The recent image reading devices irradiate a document placed on a document table with light outputted from a light source and read a document surface based on light reflected by the document. Such an image reading device includes a light irradiation device structured to irradiate the document surface, at an irradiation point thereon, with light in two different directions. The irradiation point is irradiated with light in the two directions, so as to prevent occurrences of shadows on the document surface. In other words, if the document surface is irradiated with light only in a single direction, the document-reading quality may be degraded, due to shadows induced on the document surface. In order to prevent this, the document surface is irradiated with light in two directions.

In order to irradiate the document surface with light in two directions, a light guide member for guiding light outputted (emitted) from the light source to the irradiation point is used. As such light guide members, there have been known light guide members provided with two emission surfaces (a first emission surface and a second emission surface). Light emitted from the first emission surface is directed to the irradiation point, using a reflection surface. Further, light emitted from the second emission surface is directly directed to the irradiation point.

SUMMARY

Example embodiments of the present invention include a light irradiation device provided with: a light source to output diffused light; and a light guide member to guide the diffused light to an irradiation point. The light guide member includes an incidence surface which the diffused light enters, a first emission surface to emit the entered diffused light, while further diffusing the entered diffused light with a first diffusion characteristic to emit the diffused light at a first diffusion angle, and a second emission surface to emit the entered diffused light, while further diffusing the entered diffused light with a second diffusion characteristics to emit the diffused light at a second diffusion angle. The second diffusion angle provided by the second diffusion characteristic is smaller than the first diffusion angle provided by the first diffusion characteristic.

Example embodiments of the present invention include an image foil ling apparatus including the light irradiation device.

BRIEF DESCRIPTION OF THE SEVERAL VIEWS OF THE DRAWINGS

FIG. 10 is a graph illustrating an example of the illuminance distribution, in a case where a first emission surface and a second emission surface are made to have respective different diffusion characteristics, in the light irradiation device according to the embodiment of the present invention;

FIG. 11 is a view illustrating an example of the ratio of center illuminance values, in a case where the first emission surface and the second emission surface are made to have respective different diffusion characteristics;

FIG. 12 is a graph illustrating an example of the luminous intensity distributions of light rays which are emitted from the light guide member included in the aforementioned light irradiation device, through the respective emission surfaces thereof;

DETAILED DESCRIPTION

Hereinafter, an embodiment of a light irradiation device and an image forming apparatus according to the present invention will be described, with reference to the drawings.

Figure 1:
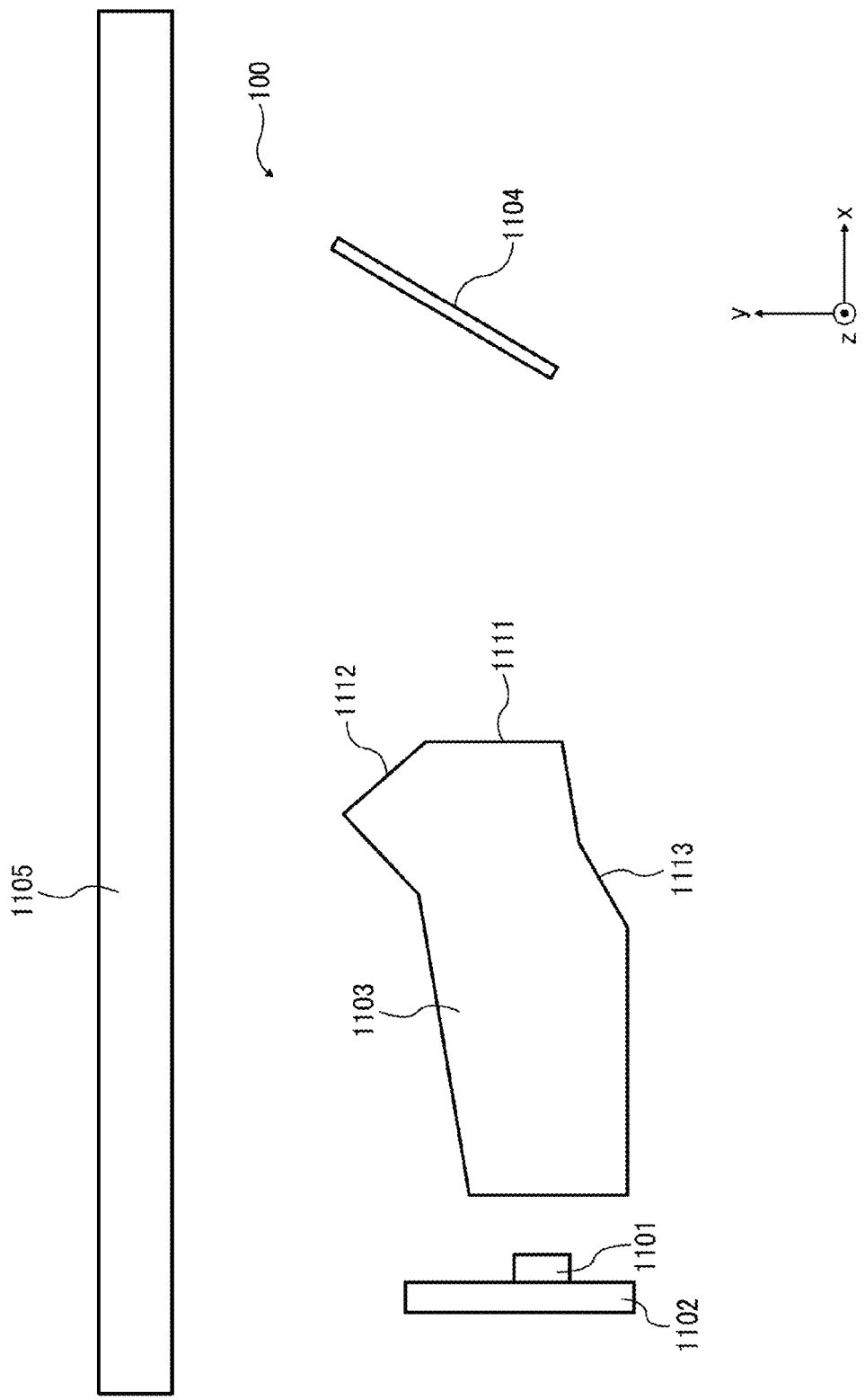
FIG. 1 is an optical placement view illustrating an example of a light irradiation device according to an embodiment of the present invention.

FIG. 1 is a view illustrating an example of a light irradiation device 100 according to the present embodiment. Specifically, FIG. 1 is also a cross-sectional view of the light irradiation device 100, taken along the X direction. Referring to FIG. 1, the light irradiation device 100 includes light sources 1101 constituted by LED light sources, a substrate 1102 on which the light sources 1101 are mounted, a light guide member 1103, and an opposing reflector 1104 constituted by a reflective mirror. Further, a structure that holds these respective components at predetermined positions is omitted for simplicity.

Light outputted (emitted) from the light sources 1101 proceeds in the rightward direction in the sheet surface of FIG. 1. This direction in which the light proceeds is assumed to be the X direction. Further, the direction that is orthogonal to the X direction and directs toward the placement of a exposure glass 1105 with respect to the light sources 1101 is assumed to be a Y direction. In FIG. 1, the X direction is represented by an X axis, while the Y direction is represented by a Y axis. Further, an axis orthogonal to the X axis and the Y axis is assumed to be a Z axis, and the direction of the Z axis is assumed to be a Z direction. In an image forming apparatus, which will be described later, the X direction is the sub-scanning direction, and the Z direction is the main scanning direction.

The light guide member 1103, the opposing reflector 1104 and the exposure glass 1105 have structures having respective same shapes and respective lengths corresponding to the size of document to be read, in the Z direction. Further, the light sources 1101 are arranged in plural, within a range corresponding to the size of document to be read, in the Z direction.

The light outputted from the light sources 1101 enters the light guide member 1103 through its incidence surface, further passes through a first emission surface 1111 and a second emission surface 1112 and is emitted from the light guide member 1103 in respective directions.

The side surfaces of the light guide member 1103 are grinded surfaces which have been grinded in a mirror-surface shape and also have been subjected to mirror processing at their inner-surface sides. In this case, "the side surfaces of the light guide member 1103" refer to its surfaces other than the incidence surface, the first emission surface 1111 and the second emission surface 1112. Accordingly, if the light having entered the light guide member 1103 through its incidence surface enters any of the side surfaces at an incidence angle equal to or more than a certain angle, it is totally reflected by this side surface without passing through this side surface. Therefore, the light having entered the light guide member 1103 is emitted therefrom through the first emission surface 1111 and the second emission surface 1112, after being guided through the light guide member 1103 without being attenuated, except for being subjected to surface reflection at the incidence surface of the light guide member 1103 and being absorbed by the material forming the light guide member 1103.

Next, there will be described the light emitted from the two emission surfaces included in the light guide member 1103. Mainly, the light emitted from the first emission surface 1111 is light emitted therefrom without having been reflected by the side surfaces 1113 of the light guide member 1103 and, thus, is light proceeding to an irradiation point on the exposure glass 1105 by being reflected by the opposing reflector 1104. On the other hand, the light emitted from the second emission surface 1112 is light which proceeds directly to the irradiation point on the exposure glass 1105 from the second emission surface 1112 after having been totally reflected by the side surfaces 1113.

The light irradiation device 100 emits, from the first emission surface 1111, light mainly composed of an optical-axis center portion of the light having entered the light guide member 1103 through its incidence surface, which is normal to the optical axis of diffused light outputted from the light sources 1101. Further, the light irradiation device 100 emits, from the second emission surface 1112, light mainly composed of a peripheral portion of the light having entered the light guide member 1103, which is around the optical-axis center portion thereof.

Recently, LEDs with higher brightness may be used as light sources. However, light irradiated from the light source needs to satisfy the laser safety standards. In view of this, an optical component for diffusing light may be placed at any position in an optical path from the light sources to the irradiation point, so as to alleviate the light straightness of the LED light sources.

In the light irradiation device using the light guide member having the two emission surfaces, the intensity of light emitted from the first emission surface in the light guide member, and the intensity of light emitted from the second emission surface are varied, depending on the shape of the light guide member, and depending on the positional relationship between the two emission surfaces and the positions where the light sources are placed. In the light guide member having the two emission surfaces, if the first emission surface and the second emission surface are made to have the same diffusion characteristics, one of the emission surfaces is caused to emit weaker light, while the other emission surface is caused to emit stronger light. This induces a state where there is a brightness imbalance between the lights directed in the two directions, thereby inducing shadows on the document surface.

Further, if the diffusion characteristic for stronger light is set, in coincident with the diffusion characteristic of the emission surface for weaker light, this degrades the light utilization efficiency of the light irradiation device.

In view of this, there is a need for a light irradiation device capable of satisfying laser safety standards and high light utilization efficiency.

Figure 2:
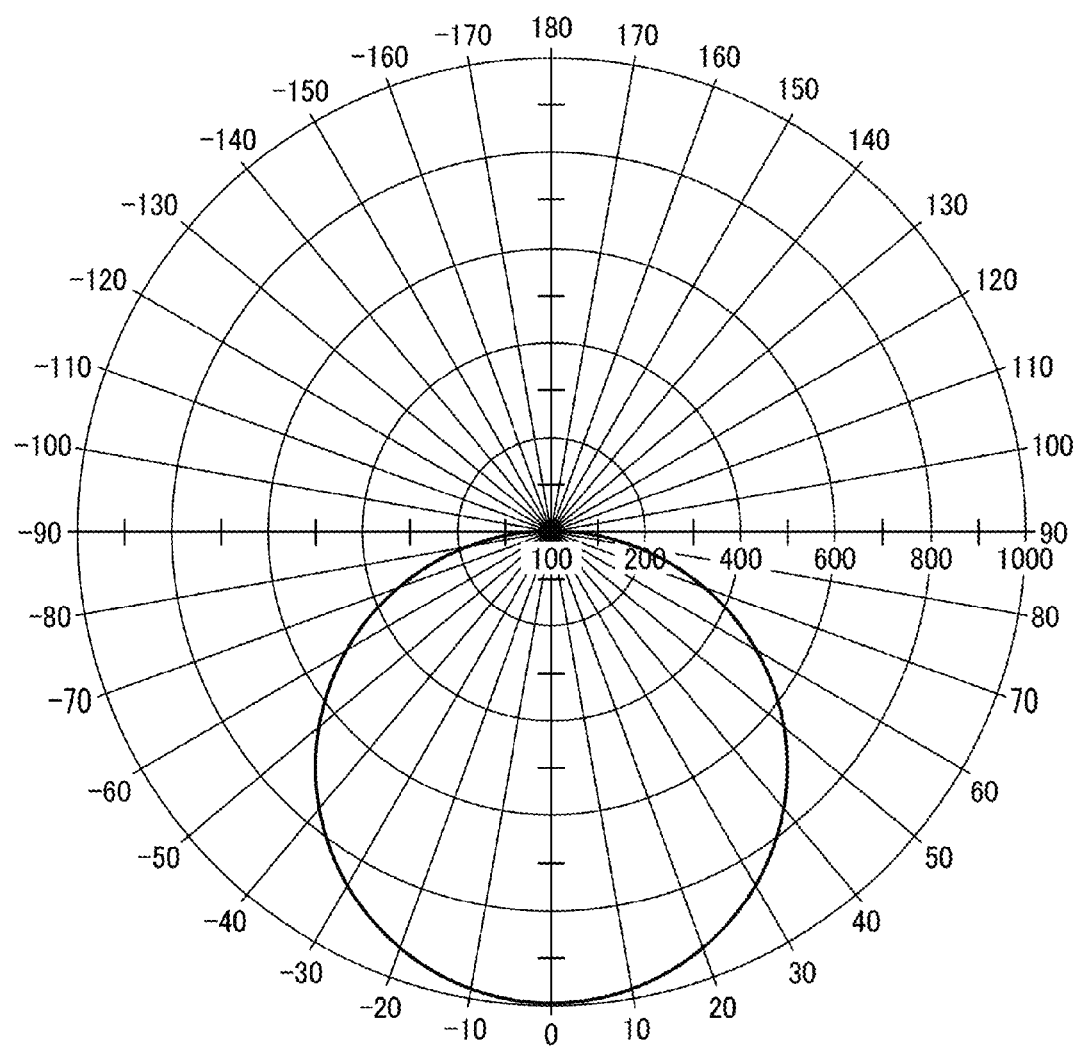
FIG. 2 is a characteristic view illustrating an example of a light distribution characteristic of light sources included in the aforementioned light irradiation device.

FIG. 2 is a characteristic view illustrating an example of a light distribution characteristic of the light sources 1101. The LEDs used as the light sources 1101 include phosphors having a flat surface shape which is exposed, as a resin lens and the like for condensing light is not provided therein. Such LEDs output light exhibiting a light distribution characteristic, which is a characteristic called "Lambert light emission" as illustrated in FIG. 2.

In FIG. 2, the direction of 0 degree (the downward direction in the sheet surface of FIG. 2) corresponds to the X direction (see FIG. 1). Namely, the direction normal to the light-emission surfaces of the light sources 1101 corresponds to the direction of 0 degree in FIG. 2. As can be clearly seen from FIG. 2, the direction in which strongest light is emitted from the light sources 1101, namely the direction in which there is a highest luminous intensity, is the direction of 0 degree.

Accordingly, the luminous intensity of light outputted from the first emission surface 1111 placed in the direction normal to the emission surfaces of the light sources 1101 is higher than the luminous intensity of light outputted from the second emission surface 1112. Therefore, the respective diffusion characteristics of the first emission surface 1111 and the second emission surface 1112 in the light guide member 1103 are adjusted. More specifically, a second diffusion characteristic exhibited by the second emission surface 1112 and a first diffusion characteristic exhibited by the first emission surface 1111 are adjusted, such that the luminous intensity of light outputted from the second emission surface 1112 falls within a range which does not exceed the luminous intensity of light outputted from the first emission surface 1111.

Figure 3:
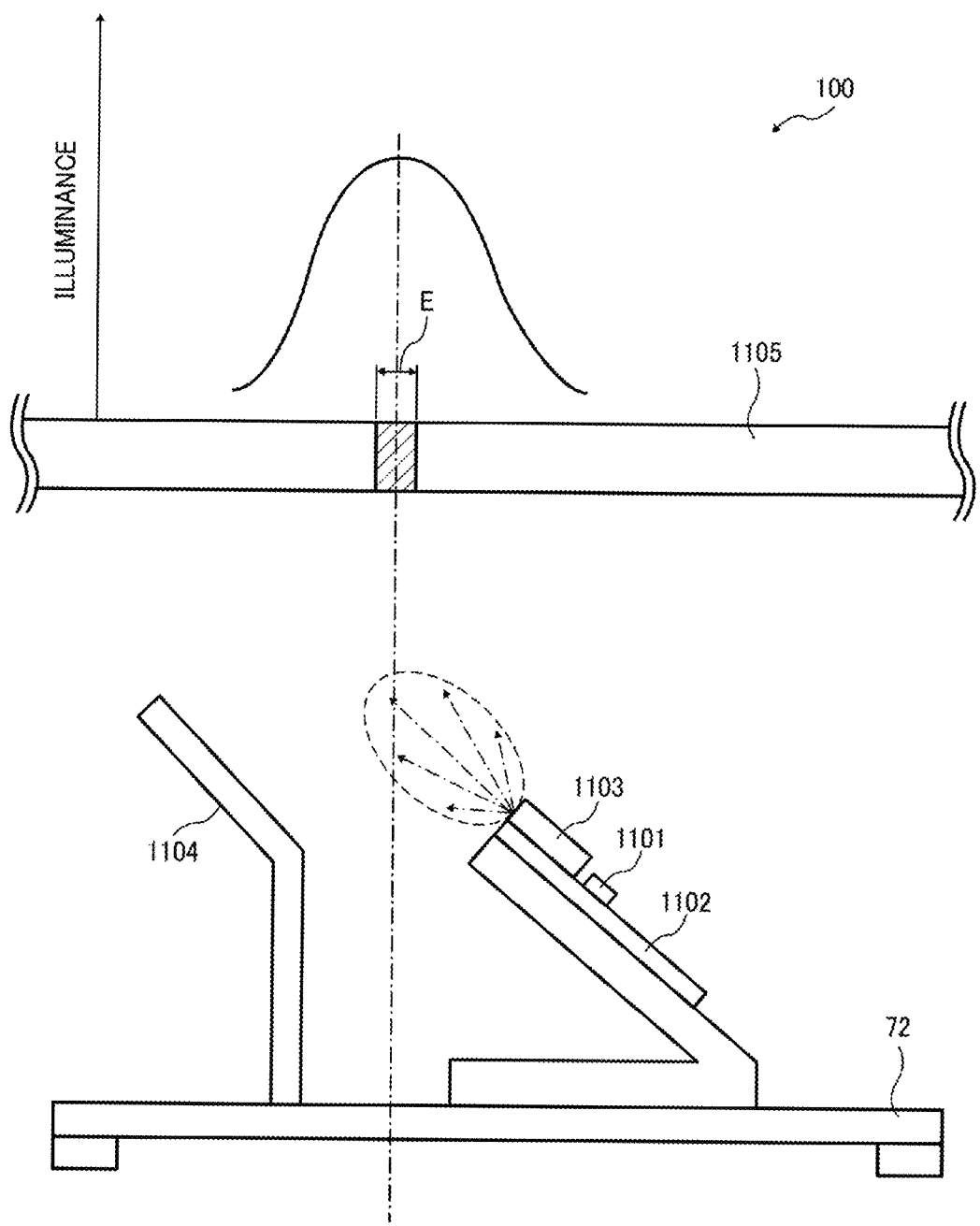
FIG. 3 is a view illustrating an example of an illuminance distribution in the aforementioned light irradiation device.

Hereinafter, there will be described differences between the first diffusion characteristic and the second diffusion characteristic in the light guide member 1103. At first, there will be described the illuminance distribution of output light (diffused light) from the LEDs used as the light sources 1101. FIG. 3 is a view illustrating an example of the illuminance distribution of when an area E in the exposure glass 1105 is irradiated by the light irradiation device 100.

The diffused light outputted from the light sources 1101 enters the light guide member 1103 and is emitted therefrom through the first emission surface 1111 and the second emission surface 1112. A portion of the light emitted from the light guide member 1103 proceeds directly to the area E in the exposure glass 1105, while another portion of the light emitted from the light guide member 1103 proceeds to the area E in the exposure glass 1105 after being reflected by the opposing reflector 1104.

This area E forms the irradiation point. In the light irradiation device 100, the light guide member 1103 and the opposing reflector 1104 are placed, such that there is a highest illuminance at the irradiation point.

Figure 4:
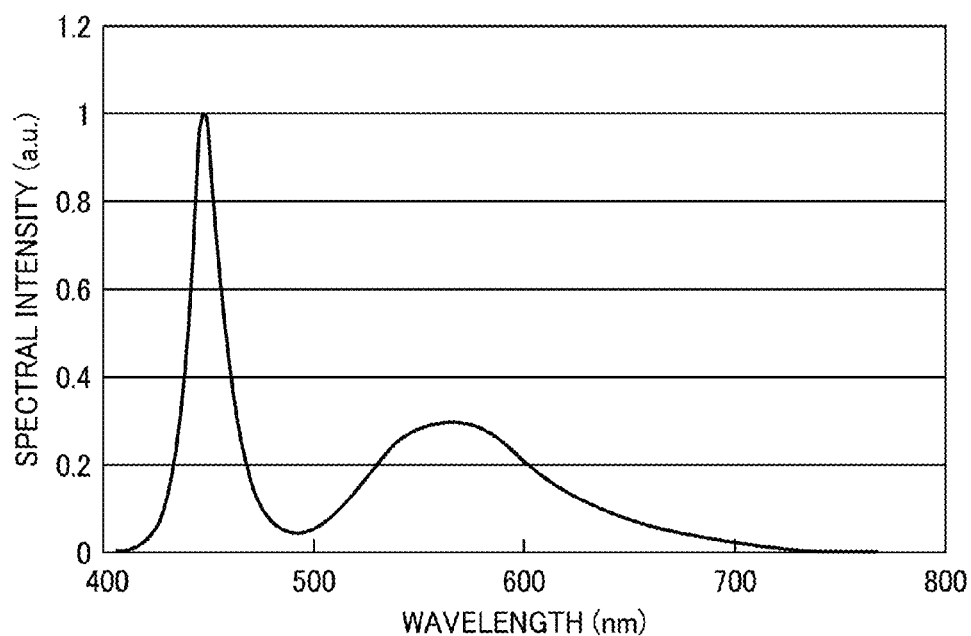
FIG. 4 is a graph illustrating an example of a light emission spectrum of a common pseudo-white light-emitting diode (LED)

Next, a light emission spectrum of the light sources 1101 will be described. FIG. 4 is an example of a light emission spectrum of a common pseudo-white LED which is used as a light source 1101. In FIG. 4, the lateral axis represents the wavelength of light, while the longitudinal axis represents the spectral intensity. The pseudo-white LED includes a blue LED chip for emitting light rays with wavelengths of about 450 nm, and phosphors with yellow, orange and other colors which are embedded around the blue LED chip and, further, is adapted to excite these phosphors for causing them to generate fluorescence, thereby mixing the lights therefrom for generating white light. Therefore, the pseudo-white LED exhibits a significantly-intensive light emission spectrum from the blue LED chip as in FIG. 4, even though it has poor human visibility and makes less contributions to the illuminance value.

Figure 5:
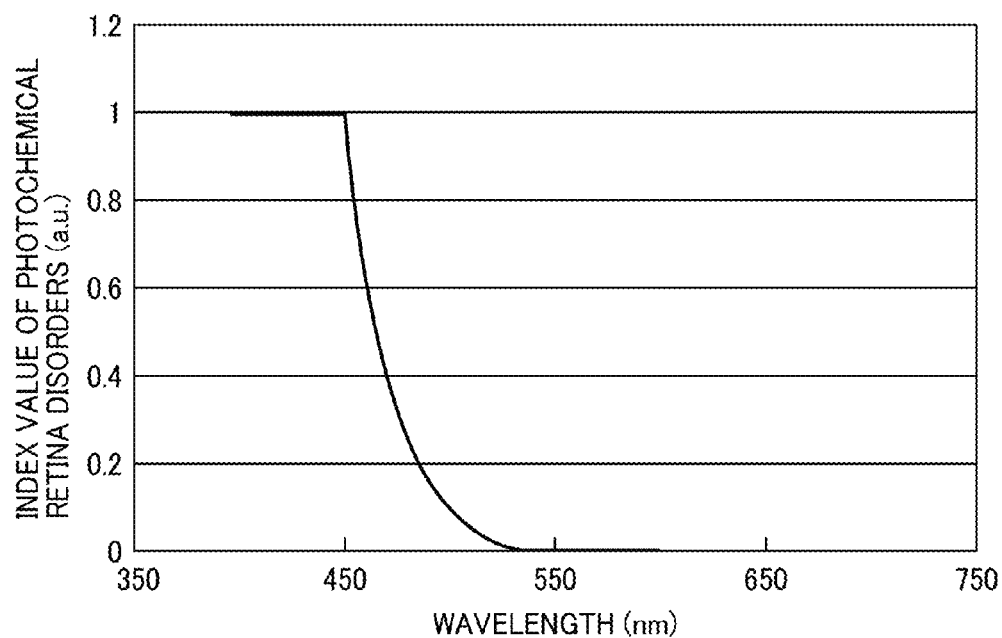
FIG. 5 is a graph illustrating "photochemical retina disorders" according to laser safety standards (JIS C 6802, IEC60825)

Next, there will be described influences of light on human retinas. FIG. 5 is a graph illustrating "photochemical retina disorders" according to the laser safety standards (JIS C 6802, IEC60825). Further, FIG. 6 is a graph illustrating "retina disorders caused by blue light" according to lamp safety standards (JIS C 7550, IEC/EN 62471).

Figure 6:
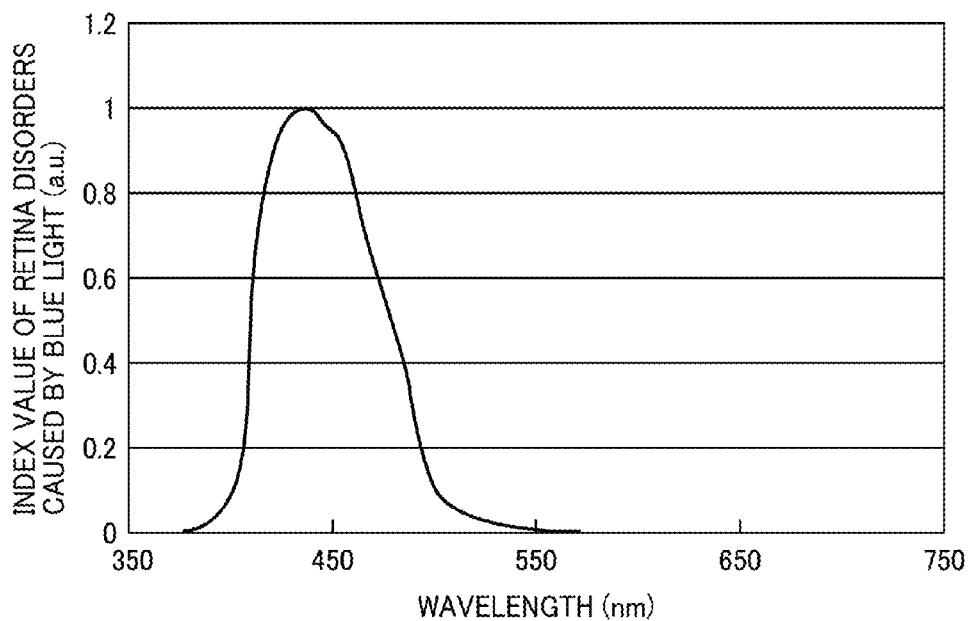
FIG. 6 is a graph illustrating "retina disorders caused by blue light" according to lamp safety standards (JIS C 7550, IEC/EN 62471)

In the graphs in FIGS. 5 and 6, the lateral axis represents the wavelength of light, while the longitudinal axis represents an index of optical retina disorders. As can be clearly seen from FIGS. 5 and 6, light with wavelengths of about 400 nm to 450 nm exerts largest influences on the value of the index of optical retina disorders.

Accordingly, in cases of employing a light emission device having higher spectral intensities around these wavelengths, such as pseudo-white LEDs, the light source device is more liable to reach the threshold value of the safety standard index value even at lower illuminance values, in comparison with those employing other light emission device. In order to attain a safety standard reference class more safely, the background light source device has been operated at lower illuminance values, than the illuminance values based on its capability. In contrary, the light irradiation device 100 is capable of improving light utilization efficiency, while satisfying the laser safety standard.

Next, there will be described "the diffusion angle", which is an index used in describing differences between the first diffusion characteristic of the first emission surface 1111 and the second diffusion characteristic of the second emission surface 1112, in the present embodiment.

Figure 7:
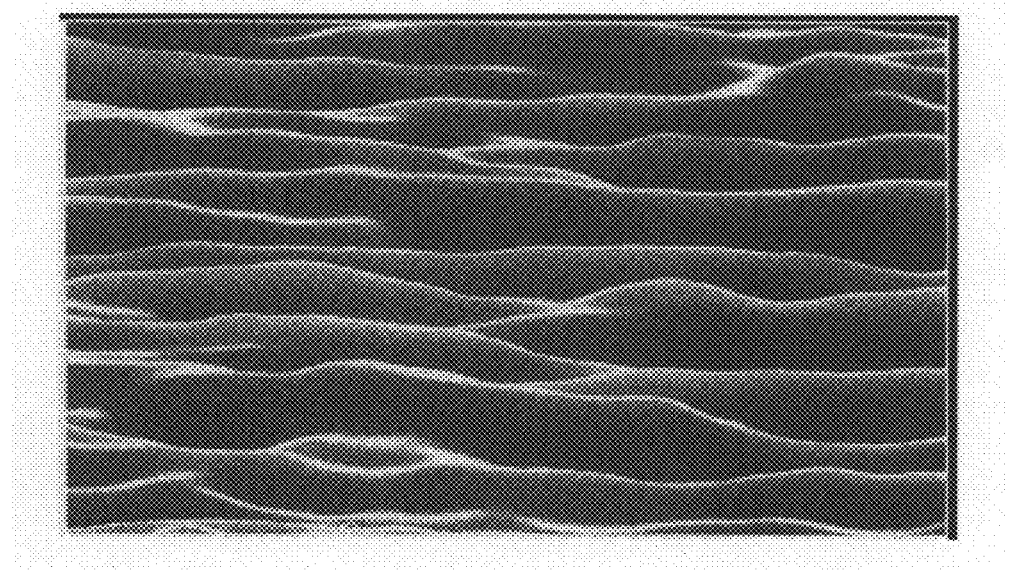
FIG. 7 illustrates an example of fine structures provided in emission surfaces of a light guide member included in the light irradiation device according to the embodiment of the present invention.

By applying fine structures as illustrated in FIG. 7 to the first emission surface 1111 and the second emission surface 1112, it is possible to provide the respective emission surfaces with "a first diffusion characteristic" and "a second diffusion characteristic" which are respective different diffusion characteristics. Accordingly, the difference in "the diffusion angle" between the first diffusion characteristic and the second diffusion characteristic can be provided by the difference between the respective fine structures in the first emission surface 1111 and the second emission surface 1112.

The diffusion angle is as follows. That is, when a straightly-propagating light ray such as laser light enters a diffusion structural member vertically thereto, the diffusion angle refers to the angular width at which the intensity of the diffused light emitted therefrom is half its maximum value (the full width at half maximum). Namely, the magnitude of the diffusion angle directly indicates the magnitude of the degree of the diffusion. Even the same laser light is decreased in intensity with increasing diffusion angle.

Hereinafter, with reference to FIG. 8, using a simple light guide member model, there will be described the relationship between the index value according to the laser safety standards (HS 6802, IEC60825), the illuminance at a position spaced apart by 5 mm from the emission surface of the light guide member, and the degree of the diffusion caused by the diffusion characteristic provided to this light guide member.

Figure 8:
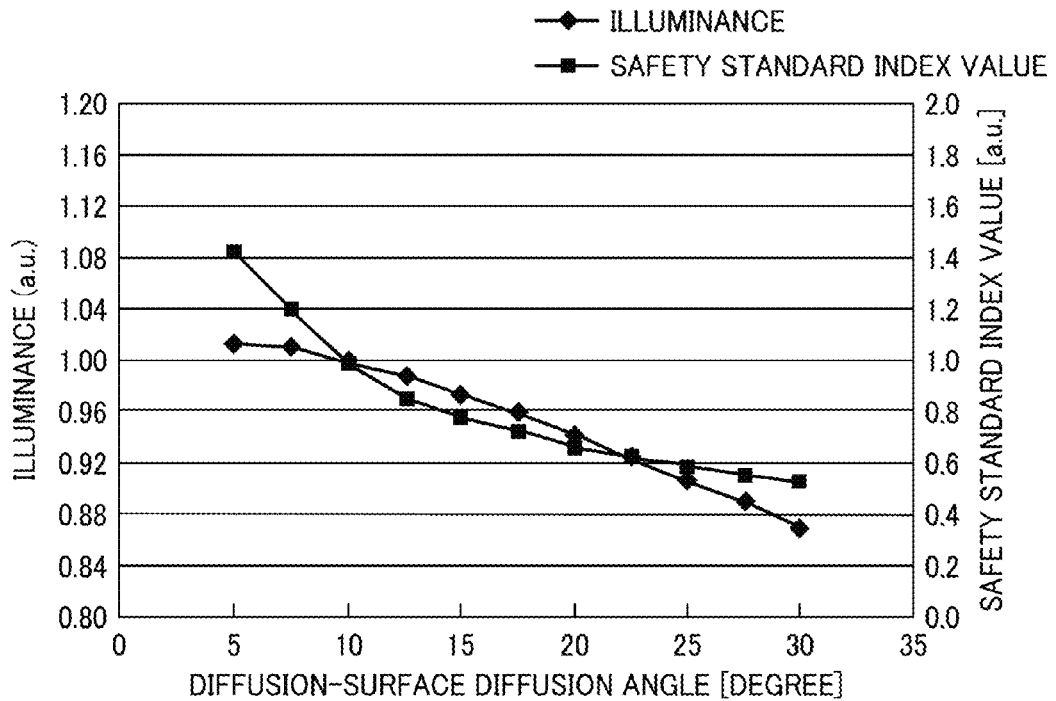
FIG. 8 is a graph illustrating the relationship between the index value according to the laser safety standards (JIS 6802, IEC60825), the illuminance at a position spaced apart by 5 mm from the emission surface of the light guide member, and the degree of the diffusion caused by the diffusion characteristic provided to this light guide member.

In FIG. 8, the lateral axis represents the diffusion angle of the diffusion surface (the diffusion-surface diffusion angle), while the longitudinal axis represents the illuminance and the safety standard index.

Figure 9:
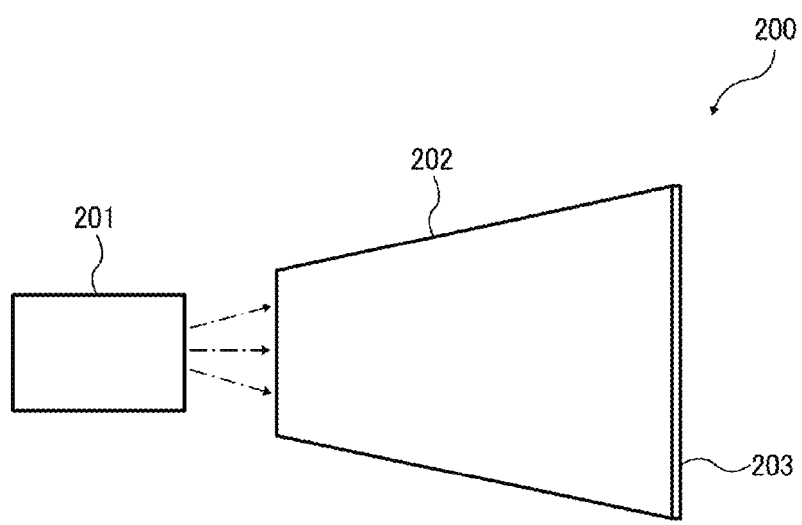
FIG. 9 is a view illustrating an example of a light guide model.

FIG. 9 is a view illustrating an example of a light irradiation model used for the graph illustrated in FIG. 8. As illustrated in FIG. 9, the light irradiation model 200 is constituted by an LED 201 as a light source, and a light guide member model 202 having a diffusion surface 203 as an emission surface.

In the graph illustrated in FIG. 8, the respective values are normalized, such that the illuminance and the safety standard index value are "1", when the diffusion angle provided by the diffusion characteristic provided to the diffusion surface 203 is 10 degrees. As illustrated in FIG. 8, as the diffusion angle of the diffusion surface 203 in the light irradiation model 200 is increased, the safety standard index value is made smaller and, at the same time, the illuminance is made smaller. Namely, assuming that the laser safety standard is considered, if the diffusion angle of the diffusion surface 203 is made larger, the illuminance on the document surface decreases, thereby degrading the light efficiency.

Therefore, in the present embodiment, it is desirable to vary the luminous intensity of light which passes through the first emission surface 1111 and the luminous intensity of light which passes through the second emission surface 1112 in the light guide member 1103, through the diffusion characteristics provided to these respective surfaces.

Namely, it is desirable to set the first diffusion angle provided by the first diffusion characteristic of the first emission surface 1111 which is positioned in the direction of 0 degree in FIG. 2 with respect to the light sources 1101, and the second diffusion angle provided by the second diffusion characteristic of the second emission surface 1112, such that the first diffusion angle is larger than the second diffusion angle. Namely, it is desirable to provide the respective diffusion characteristics, such that the second diffusion angle is smaller than the first diffusion angle.

Next, FIG. 10 illustrates an example of the illuminance distribution at the irradiation point, in a case where the first diffusion angle provided to the first emission surface 1111 and the second diffusion angle provided to the second emission surface 1112 are set to be respective different values, in the light irradiation device 100 according to the present embodiment.

FIG. 10 illustrates the illuminance distribution at the irradiation point, in the case where the half width of the first diffusion angle provided to the first emission surface 1111 is set to 5 degrees, and the half width of the second diffusion angle provided to the second emission surface 1112 is set to 15 degrees.

Further, FIG. 11 illustrates the ratio of the center illuminance value of when the diffusion angles of both the surfaces are set to 15 degrees, to the center illuminance value of when the half width of the first diffusion angle provided to the first emission surface 1111 is set to 5 degrees, and the half width of the second diffusion angle provided to the second emission surface 1112 is set to 15 degrees. As illustrated in FIG. 11, when the first diffusion angle and the second diffusion angle are set to be respective different values, the center illuminance value is made higher by 6%.

As already described, the first diffusion characteristic provided to the first emission surface 1111 and the second diffusion characteristic provided to the second emission surface 1112, in the light guide member 1103, are provided by the fine shapes provided in the surfaces of the emission surfaces. The light ray having passed through each of these surfaces is diffused in a conical shape with a vertex forming an emission point.

As described above, in recent years, it has been possible to arbitrarily change these diffusion angles and, also, it has been possible to make the diffusion angles in the horizontal direction and in the vertical direction unequal to each other.

FIG. 12 is a graph illustrating the luminous intensity distributions of light rays emitted from the light guide member 1103 through the respective emission surfaces thereof, which was resulted from simulations of the luminous intensity distributions of light rays emitted from the light guide member 1103 through the two emission surfaces thereof.

In FIG. 12, the direction of an angle of 0 degree in the lateral axis is coincident with the X direction (the horizontally-leftward direction) illustrated in FIG. 1.

Further, the direction of +90 degrees is coincident with the Y direction (the vertically-upward direction) illustrated in FIG. 1. Further, the luminous intensity is normalized with its maximum value.

As can be clearly seen from FIG. 12, the light ray having a highest luminous intensity, out of the light rays emitted from the light guide member 1103, is emitted from the first emission surface 1111. In this case, the luminous intensity of the light ray emitted from the second emission surface 1112 is about 60 percent of the luminous intensity of the light ray from the first emission surface 1111, in the case where the second diffusion angle provided by the second diffusion characteristic is 15 degrees.

As illustrated in FIG. 12, when the diffusion angle of the second emission surface 1112 is changed to 5 degrees, the aforementioned light-ray ratio is increased to 80%, but does not exceed the luminous intensity from the first emission surface 1111.

Therefore, the safety standard value of the light irradiation device 100 employing the light guide member 1103 can be calculated regarding light rays emitted from the first emission surface 1111, even when the diffusion angle of the second emission surface 1112 is reduced to 5 degrees. In other words, namely, the safety standard value of the light irradiation device 100 can be calculated in relation to the diffusion angle of the first emission surface, rather than in relation to the diffusion angle of the second emission surface 1112.

On the other hand, as illustrated in FIG. 12, the illuminance on the document surface depends on the second diffusion characteristic of the second emission surface 1112. Accordingly, the luminous intensity is increased (the brightness is increased), depending on the second diffusion angle provided by the second diffusion characteristic of the second emission surface 1112. Therefore, in order to increase the illuminance on the document surface, it is preferable to make the second diffusion angle smaller (narrower) than the first diffusion angle, as long as the luminous intensity of the light ray emitted from the second emission surface 1112 does not exceed the luminous intensity of the light ray emitted from the first emission surface 1111.

With the light irradiation device 100 according to the present embodiment which has been described above, the diffusion angle of the second emission surface 1112 for irradiation with light with a lower intensity, out of the two emission surfaces included in the light guide member 1103, is made smaller than the diffusion angle of the first emission surface 1111 for irradiation with light with a higher intensity. With this configuration, the light irradiation device 100 can achieve high light utilization efficiency, while satisfying laser safety standards.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, while there has been exemplified the light guide member 1103 having the two emission surfaces, the light irradiation device according to the present invention is not limited thereto. For example, the light irradiation device may include a light guide member having three or more emission surfaces. In another example, the light irradiation device may employ a light guide member having two or more incidence surfaces as well as emission surfaces. In another example, the light guide member with surfaces which reflect light rather than surfaces for passing light widely therethrough may be provided.

Figure 13:
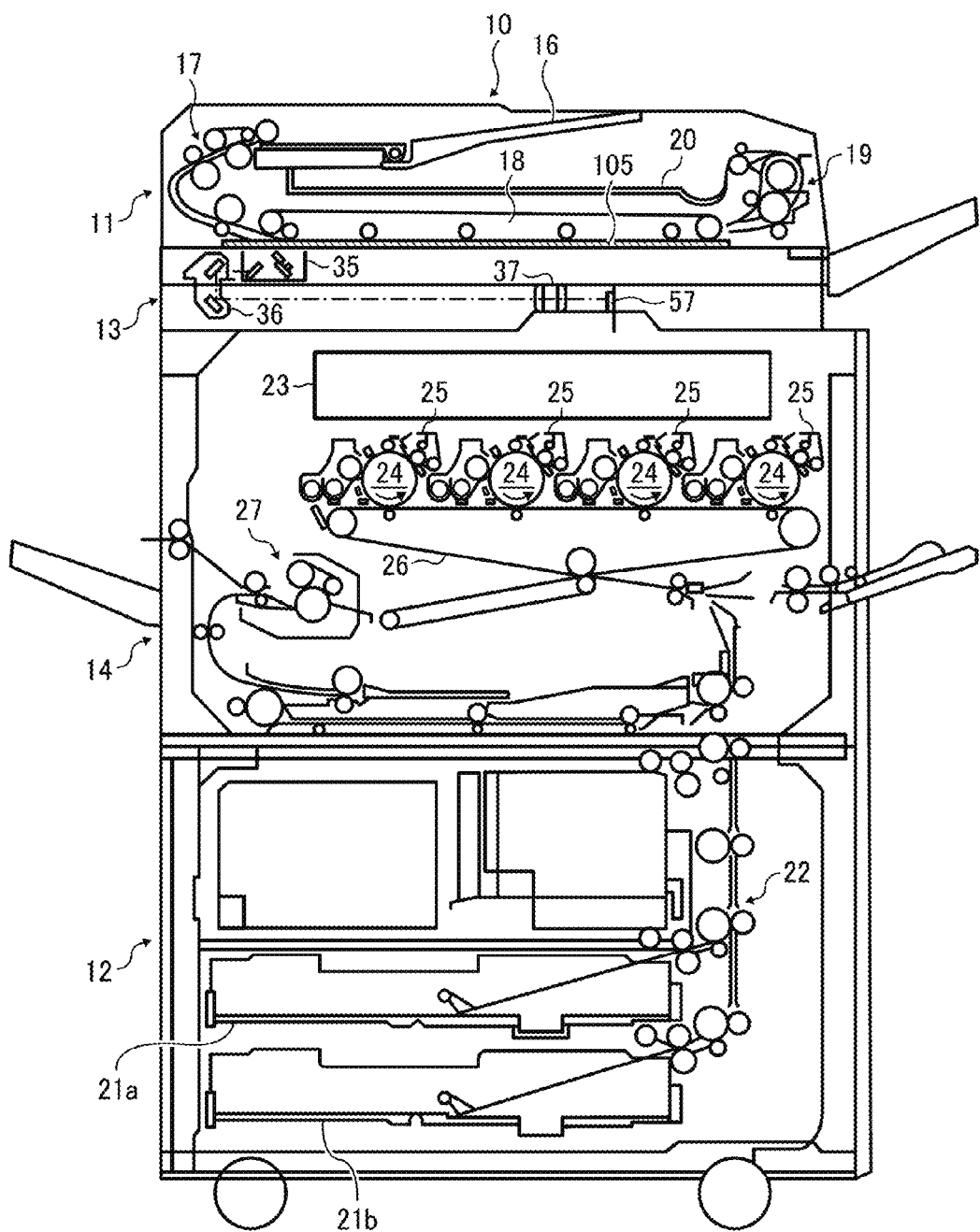
FIG. 13 is a longitudinal cross-sectional view illustrating an image forming apparatus according to an embodiment of the present invention.

Next, an embodiment of the image forming apparatus according to the present invention will be described, with reference to FIG. 13. FIG. 13 is a longitudinal cross-sectional view of a copier 10 as an example of the image forming apparatus according to the present embodiment. Referring to FIG. 13, the copier 10 includes an automated document feeder (ADF) 11, a sheet feeder 12, an image reading device 13, and an image forming device 14. The other examples of image forming apparatus include a multifunctional printer (MFP), a facsimile, a scanner, and a printer.

The ADF 11 includes a document tray 16, a separation sheet feeding unit 17, a conveying belt 18, a sheet ejecting unit 19, and a sheet ejection tray 20.

A document placed on the document tray 16 is conveyed onto the exposure glass 1105 which forms a document table, through the separation sheet feeding unit 17 including various types of rollers including a sheet feeding roller and a separation roller. After the completion of reading of the document conveyed onto the exposure glass 1105, the document is conveyed from the exposure glass 1105 through the conveying belt 18. The document having been conveyed from the exposure glass 1105 is ejected to the sheet ejection tray 20, through the sheet ejecting unit 19 including various types of sheet-ejection rollers.

Further, in reading a double-sided document, the document is returned onto the exposure glass 1105, through the conveying belt 18 and a branching mechanism provided in the sheet ejecting unit 19, and its un-read surface is read.

The sheet feeder 12 includes a first sheet feeding cassette 21a and a second sheet feeding cassette 21b which are adapted to house recording sheets as recording mediums with different sizes. The recording sheets which are housed in the first sheet feeding cassette 21a and the second sheet feeding cassette 21b are conveyed to a transfer position, through the sheet feeding unit 22 including various types of rollers.

The image reading device 13 drives a first carriage 35 and a second carriage 36 in the leftward and rightward directions in the sheet surface of FIG. 5 (namely, in the sub-scanning direction) for directing the light from the light sources to the document surface, thereby reading the document surface. This read light is reflected by mirrors and, thereafter, is introduced into an image reading sensor such as a CCD, through a lens unit 37. Further, the structure of the image reading device 13 will be described in more detail, later.

The image forming device 14 includes a light exposure device 23, a plurality of photosensitive drums 24, development devices 25, a transfer belt 26 for performing transfer, and a fixing device 27.

The light exposure device 23 creates writing signals, based on reading signals introduced into the lens unit 37.

Through the writing signals created by the light exposure device 23, latent images are formed on the surfaces of the plural photosensitive drums 24.

The development devices 25 contain respective toners with different colors such as cyan, magenta, yellow and black colors and, supply the respective toners with the different colors to the respective photosensitive drums 24 to develop the latent images to visible images.

The visible images formed on the photosensitive drums 24 are transferred to the transfer belt 26, so as to superimpose the visible images on each other, to form a color image on the transfer belt 26. Further, the transfer belt 26 transfers the color image to a recording sheet fed from the sheet feeder 12.

The fixing device 27 fixes the color image having been transferred on the recording sheet to the recording sheet.

Next, the structure of the image reading device 13 will be described, with reference to FIG. 14. The image reading device 13 mainly includes the exposure glass 1105, a main-body frame 31, the first carriage 35, the second carriage 36, the lens unit 37, and an image pickup device 57.

Further, the image reading device 13 also includes a driving rail, a pulley, a motor, a wire, and a structural member for holding them.

The first carriage 35 forms the light irradiation device 100, which has been already described. The first carriage 35 includes the light sources 1101, the substrate 1102 on which the light sources 1101 are mounted, the light guide member 1103 made of a transparent material, and the opposing reflector 1104 constituted by a reflection mirror.

The second carriage 36 includes two reflection mirrors 44b and 44c.

Figure 14:
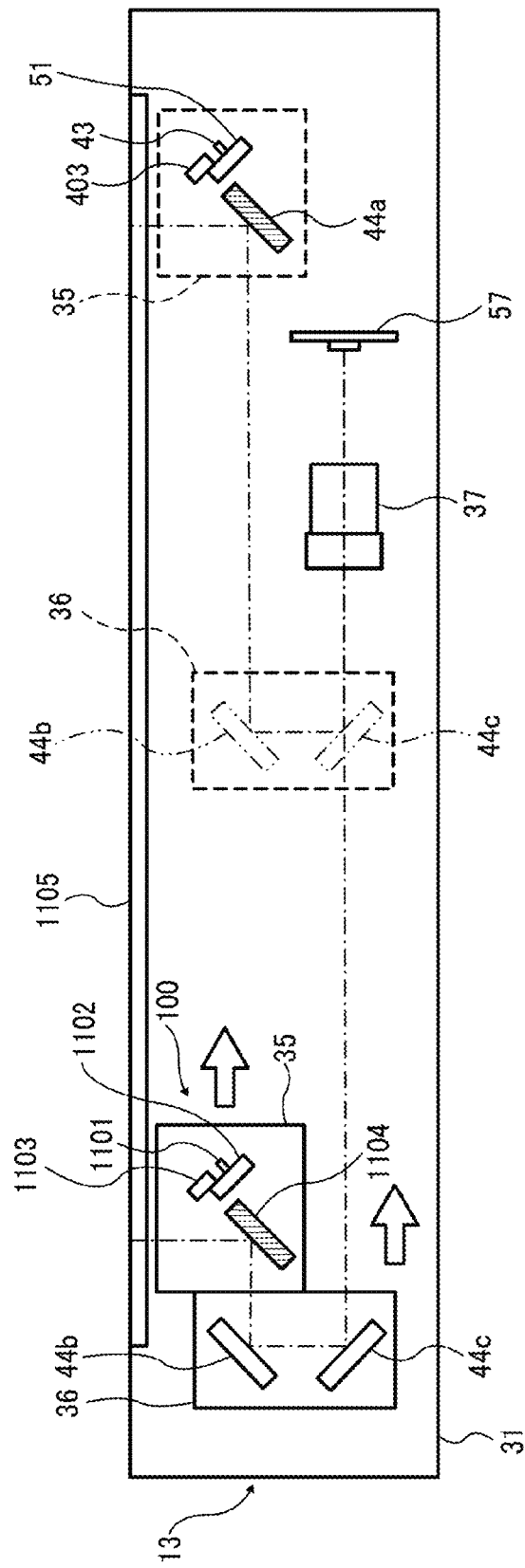
FIG. 14 is a longitudinal cross-sectional view illustrating an example of an image reading device included in the image forming apparatus of FIG. 13.

The image pickup device 57, and the optical components constituting the light illumination optical system which include the first carriage 35 and the second carriage 36 are shaped to be elongated or placed continuously in the direction normal to the sheet surface of FIG. 14. Further, this direction is referred to as the main scanning direction.

The document to be read is placed (held) on the exposure glass 1105. The light irradiation optical system irradiates the document surface in the main scanning direction and, further reflects light reflected by the irradiated area with the respective reflection mirrors. The reflected light is caused to enter the lens unit 37 and, thus, is condensed to form an image on the image pickup device 57. Thus, linear-shaped image data (information about the image) is acquired.

In order to acquire planar-shaped image data, linear-shaped image data can be successively acquired, while the irradiation is moved in the direction normal to the direction of main scanning, over the surface to be read. This direction of movement is referred to as the sub-scanning direction.

The image reading device 13 moves the second carriage 36, in such a way as to prevent the distance from the document surface to the image pickup device 57 through the lens unit 37 from being changed, while the first carriage 35 can be moved. This enables acquiring preferable planar-shaped image data without inducing blurriness of the image data acquired by the image pickup device 57.

By applying the light irradiation device 100 having been already described, to the illumination optical system in the copier 10 which has been described above, it is possible to provide the image forming apparatus capable of satisfying the laser safety standards, and improving light utilization efficiency.

What is claimed is:

1. A light irradiation device comprising:
   a light source to output diffused light; and
   a light guide member to guide the diffused light to an irradiation point, the light guide member including:
      an incidence surface which the diffused light outputted from the light source enters;
      a first emission surface to emit an optical-axis center portion of the entered diffused light, while further diffusing the entered diffused light with a first diffusion characteristic to emit the diffused light at a first diffusion angle; and
      a second emission surface to emit a peripheral portion of the entered diffused light, the peripheral portion being around the optical-axis center portion, while further diffusing the entered diffused light with a second diffusion characteristics to emit the diffused light at a second diffusion angle,
   wherein the second diffusion angle provided by the second diffusion characteristic is smaller than the first diffusion angle provided by the first diffusion characteristic.

2. The light irradiation device of claim 1, further comprising:
   a mirror to reflect a portion of the diffused light emitted from the light source, to the irradiation point.

3. The light irradiation device according to claim 1, wherein
   the first emission surface has a fine structure defining the first diffusion characteristic, and
   the second emission surface has a fine structure defining the second diffusion characteristic.

4. The light irradiation device according to claim 1, wherein the light guiding member further includes
   a mirror processed surface, other than the first emission surface and the second emission surface, having an inner surface applied with mirror processing, so as to prevent the entered diffused light from being emitted from the surface other than the first emission surface and the second emission surface.

5. An image forming apparatus comprising:
   the light irradiation device of claim 1, the irradiation point being a part of a document surface;
   an image reading device to read an image on the document surface, using reflected light reflected from the irradiation point; and
   an image forming device to form an image on a recording sheet, based on data of the image read by the image reading device.

6. A light irradiation device comprising:

a light source to output diffused light;

a folding-back mirror to reflect a portion of the diffused light emitted from the light source, to the irradiation point, a light guide member to guide the diffused light to the irradiation point via the mirror, the light guide member including:

an incidence surface which the diffused light outputted from the light source enters;

a first emission surface to emit the entered diffused light toward the folding-back mirror, while further diffusing the entered diffused light with a first diffusion characteristic to emit the diffused light at a first diffusion angle; and a second emission surface to emit the entered diffused light toward the irradiation point, while further diffusing the entered diffused light with a second diffusion characteristics to emit the diffused light at a second diffusion angle, wherein the second diffusion angle provided by the second diffusion characteristic is smaller than the first diffusion angle provided by the first diffusion characteristic.

7. The light irradiation device according to claim 6, wherein the first emission surface has a fine structure defining the first diffusion characteristic, and the second emission surface has a fine structure defining the second diffusion characteristic.

8. The light irradiation device according to claim 6, wherein the light guiding member further includes a mirror processed surface, other than the first emission surface and the second emission surface, having an inner surface applied with mirror processing, so as to prevent the entered diffused light from being emitted from the surface other than the first emission surface and the second emission surface.

9. An image forming apparatus comprising:

the light irradiation device of claim 6, the irradiation point being a part of a document surface;

an image reading device to read an image on the document surface, using reflected light reflected from the irradiation point; and an image forming device to form an image on a recording sheet, based on data of the image read by the image reading device.

* * * * *